(12) United States Patent
Slapak

(10) Patent No.: US 9,221,337 B2
(45) Date of Patent: Dec. 29, 2015

(54) GEAR BOX

(75) Inventor: Dieter Slapak, Södertälje (SE)

(73) Assignee: SCANIA CV AB (SE)

( * ) Notice: Subject to any disclaimer, the term of this patent is extended or adjusted under 35 U.S.C. 154(b) by 187 days.

(21) Appl. No.: 14/112,155

(22) PCT Filed: Apr. 5, 2012

(86) PCT No.: PCT/SE2012/050377
§ 371 (c)(1),
(2), (4) Date: Nov. 1, 2013

(87) PCT Pub. No.: WO2012/144947
PCT Pub. Date: Oct. 26, 2012

(65) Prior Publication Data
US 2014/0046555 A1 Feb. 13, 2014

(30) Foreign Application Priority Data

Apr. 18, 2011 (SE) ...................... 1150336

(51) Int. Cl.
*B60K 25/06* (2006.01)
*B60K 17/28* (2006.01)
(Continued)

(52) U.S. Cl.
CPC ................. *B60K 25/06* (2013.01); *B60K 17/28* (2013.01); *F16H 3/16* (2013.01); *F16H 3/0915* (2013.01); *F16H 37/046* (2013.01); *F16H 2003/0822* (2013.01); *F16H 2200/0004* (2013.01); *F16H 2200/0069* (2013.01); *F16H 2200/0086* (2013.01)

(58) Field of Classification Search
None
See application file for complete search history.

(56) References Cited

U.S. PATENT DOCUMENTS 7,448,289 B1 11/2008 Bowen et al.
7,717,008 B2 5/2010 Adams
(Continued)

FOREIGN PATENT DOCUMENTS

DE 10 2005 025567 A1 12/2006
DE 10 2009 000703 A1 8/2010
(Continued)

OTHER PUBLICATIONS

English translation only of Office Action dated Aug. 19, 2014 issued in corresponding Japanese Patent Application No. 2014-506365.
(Continued)

*Primary Examiner* — John R Olszewski
*Assistant Examiner* — Gerrad A Foster
(74) *Attorney, Agent, or Firm* — Ostrolenk Faber LLP

(57) ABSTRACT

A gearbox has a first shaft with at least two journalled gearwheels, a first gearwheel to drive the first shaft in a first direction and a second gearwheel to drive the first shaft in a second direction. Devices selectively lock the gearwheels situated on the first shaft for joint rotation. A second has at least two fixed gearwheels, one second gearwheel cooperates with the first gearwheel for operation in the first direction. A third shaft with a third gearwheel which selectively in or out of engagement with the first and second gearwheels for operation in the first direction. The first gearwheel intended for operation in the first direction is also in engagement with one or more further power-transmitting device used for connecting at least one form of extra equipment, e.g. a retarder or a power take-off.

18 Claims, 4 Drawing Sheets

(51) Int. Cl.
*F16H 3/16* (2006.01)
*F16H 37/04* (2006.01)
*F16H 3/091* (2006.01)
*F16H 3/08* (2006.01)

(56) References Cited

U.S. PATENT DOCUMENTS

2005/0284244 A1 12/2005 Fuhrer et al.
2007/0113695 A1 5/2007 Adams ........................ 74/339

FOREIGN PATENT DOCUMENTS

| | | |
|---|---|---|
| EP | 1 810 867 | 7/2007 |
| EP | 2 053 282 A2 | 4/2009 |
| EP | 2 169 266 A1 | 3/2010 |
| JP | 2006-161965 | 6/2006 |
| JP | 2007 118857 | 5/2007 |
| JP | 2007-132516 | 5/2007 |
| JP | 2009-501890 | 1/2009 |
| JP | 2009-103268 | 5/2009 |
| SE | 525 612 | 3/2005 |
| WO | WO 03/095258 A1 | 11/2003 |
| WO | WO 2004/069624 | 8/2004 |
| WO | WO 2007/011211 A2 | 1/2007 |

OTHER PUBLICATIONS

International Search Report dated Jul. 3, 2012 issued in corresponding International patent application No. PCT/SE2012/050377.

GEAR BOX

CROSS-REFERENCE TO RELATED APPLICATIONS

The present application is a 35 U.S.C. §§371 national phase conversion of PCT/SE2012/050377, filed Apr. 5, 2012, which claims priority of Swedish Application No. 1150336-4, filed Apr. 18, 2011, the contents of which are incorporated by reference herein. The PCT International Application was published in the English language.

TECHNICAL FIELD

The invention relates to a gearbox connected to other equipment, a method performed using the gearbox and a motor vehicle with the gearbox.

BACKGROUND

Gearboxes are currently not used only to provide different gears during operation of an engine in order to be able to optimise fuel consumption and operating characteristics, as it is also possible to connect extra equipment to a gearbox. Extra equipment herein means any equipment not driven by the output shaft of the gearbox, such as a power take-off or a supplementary brake, especially a retarder. Electric motors may also be connected to the gearbox to achieve hybrid operation. These examples are particularly relevant to the operation of heavy utility vehicles, e.g. trucks.

A gearbox is provided with a main gear unit comprising a mainshaft and, parallel with it, a countershaft, and is also often provided with a range gear unit, e.g. a planetary gear, which can be put into a low-range gear state and a high-range gear state. The range gear unit can be put into a neutral state in which the output shaft is disconnected from the mainshaft so that the power-transmitting connection between the two shafts is broken. The mainshaft is connectable to an input shaft of the gearbox via the countershaft and to an output shaft of the gearbox via the range gear unit. A gearbox of this type may also be provided with a split gear unit via which the countershaft of the main gear unit is connectable to the gearbox input shaft.

One of the gears in the gearbox is intended to impart to the mainshaft an opposite direction of rotation to that of the engine's output shaft. If the gearbox is installed in a motor vehicle, this causes the vehicle to move rearwards. Accordingly, the gearwheel on the mainshaft will then not be in direct engagement with the corresponding gearwheel on the countershaft, but will be driven by an intermediate gearwheel which, during reversing of the vehicle, is in engagement with both of them. The mainshaft gearwheel, intended to run in the first direction of rotation, will then have an opposite direction of rotation than the other gearwheels on the mainshaft during operation, since the direction of rotation of the mainshaft gearwheel will have been changed once across the intermediate gearwheel. The mainshaft gearwheel which is intended for operation in the first direction has teeth angled in the opposite direction to teeth on the gearwheels which are intended for operation in the second direction.

WO 2004/069624 refers to a vehicle transmission in which a supplementary brake, e.g. a retarder, may be situated either immediately after the clutch (see FIG. 2 thereof) or immediately before the range gear (see FIG. 7 thereof) along the path of power delivery. The retarder is connected via a separate clutch (34, 90) which connects the retarder (56) to the gearbox mainshaft via gearwheels (32, 50).

SE525612 refers to a power take-off connected to gearbox gearwheels. FIG. 2 thereof shows the power take-off's gearwheel (6) connected to a gearwheel (23) on the countershaft (24). The specification indicates that a gearwheel (21) on the mainshaft (22) is in engagement with a countershaft gearwheel.

Disadvantages of the state of the art comprise the fact that energy losses occur when extra equipment is not being used, since the whole or parts of it are continually driven by the gearbox, and/or that the connection for extra equipment occupies space. The mainshaft gearwheel for driving the mainshaft in the first direction also causes energy losses during operation in the second direction because of being continually forced to rotate in an opposite direction. All forms of energy loss tend to increase fuel consumption.

For example, a hydrodynamic retarder consumes a relatively large amount of energy even when it is not being used, since the retarder housing can never be completely emptied of oil used for retarding. The retarder is therefore constantly forced to operate against a certain resistance.

Similar problems to those with the retarder also affect other forms of extra equipment, e.g. a power take-off for a mobile crane. Although there may be a coupling between the mobile crane and the power-transmitting means which is connected to gearwheels of the gearbox, the power-transmitting means will still be forced to operate even if the coupling to the mobile crane is not activated.

It is for various reasons currently desired to keep down the number of components used in vehicle manufacture. This is not only to make it possible to reduce costs by having as few components as possible both in production and in spare parts storage but also to facilitate assembly. A consequence of this endeavour is that components cannot be allowed to be freely changed in size and shape. For example, it is desired to have no more variants of gearbox housings than necessary, so the connection of extra equipment to a gearbox has therefore to be accommodated within the existing gearbox housing. A motor vehicle today consists of many components which have to share a limited amount of space on the chassis, making it impossible for their size and shape to be altered freely. For the above reasons it is very important to be able to modify the gearbox without its having to occupy extra space. It is therefore desirable to obviate the prior art requirement for space for connecting extra equipment to the gearbox.

OBJECT OF THE INVENTION

An object of the invention is to propose a device which solves the problems of the state of the art. The invention aims in particular to propose a gearbox to which extra equipment can be connected in a way which is efficient in terms of space and cost and which also minimises energy losses. Other objects of the invention are indicated by the description set out below.

SUMMARY OF THE INVENTION

The invention relates to a gearbox comprising a first shaft with at least two journalled gearwheels in the respective form of a first gearwheel intended to drive the first shaft in a first direction and a second gearwheel or gearwheels intended to drive the first shaft in a second direction. Devices when necessary, lock the gearwheels to, for joint rotation with, the first shaft. The gearbox comprises a second shaft with at least two firmly mounted gearwheels on it. One of them is a second gearwheel intended to cooperate with the first gearwheel for operating the latter in the first direction. The gearbox comprises also a third shaft with a third gearwheel which can be in or out of engagement with the first gearwheel for operation in the first direction. The first gearwheel intended for operation in the first direction is in engagement with one or more further power-transmitting means used for connecting at least one form of extra equipment.

Using one of the existing gearwheels on the first shaft, which gearwheel is not in constant power-transmitting communication with a corresponding gearwheel on the second shaft, to connect extra equipment makes it possible for the latter to be disconnected without need for a separate gearwheel. A great deal of space is thus saved. Being able to disconnect extra equipment when it is not needed also reduces energy losses. A significant reduction in energy losses is also achieved by the possibility of the first gearwheel for operation in the first direction being disconnected during operation in the second direction and therefore not being forced to rotate in the first direction. Up to one-third of the energy losses of the gearbox during operation in the second direction (disregarding retarders and any power take-offs) is accounted for by the mainshaft gearwheel intended for operation in the first direction.

According to an embodiment of the invention, the gearbox is installed in a motor vehicle and the first direction is the vehicle's reversing direction.

According to an embodiment of the invention, the extra equipment takes the form of a retarder, i.e. a supplementary brake used on heavy utility vehicles. It is particularly advantageous to employ the invention on such retarders which consume energy even when they are not being used, e.g. hydrodynamic retarders. A further advantage of specifically connecting the retarder to the gearwheel which propels the vehicle in the first direction is that the load distribution on the bearings of the first shaft becomes similar to loading when the first gearwheel operates in the first direction, which is advantageous.

According to another embodiment, the extra equipment takes the form of a power take-off. Connecting the power take-off to the gearwheel which propels the vehicle in the first direction thus makes it possible to use the gear ratios of the gearwheels which operate in the second direction during operation of the power take-off. The first gearwheel is only driven by the second shaft when it is in power-transmitting communication with the second gearwheel via the third gearwheel. When the first gearwheel may be in non-power-transmitting communication with the second shaft, it may be locked to, for joint rotation with, the first shaft while at the same time one of the first shaft's gearwheels for operation in the second direction is also so locked.

According to another embodiment, the gearbox is equipped with a range gear unit which may be a planetary gear. The planetary gear can in a conventional way be put into a neutral state so that the power-transmitting connection between the gearbox mainshaft and output shaft is broken. This means that in the embodiment where the gearbox is installed on a motor vehicle extra equipment can be used without the vehicle's powered wheels rotating at the same time.

According to the invention, two or more forms of extra equipment may be connected to the first gearwheel, e.g. both a retarder and one or more power take-offs.

According to a further embodiment, the third gearwheel may be movable axially on the third shaft so that it can be put into and taken out of engagement with the first gearwheel which is intended to propel the vehicle in the first direction. This is achieved in a conventional way, e.g. by a splined connection or a claw coupling. The third gearwheel may be free to rotate about its shaft and move along its shaft on the bearings, e.g. needle bearings or plain bearings, by which it is supported on its shaft. The third shaft is then firmly clamped in the gearbox housing.

The method according to the invention achieves not only the advantages already mentioned but also safe and reliable operation of extra equipment connected to the first gearwheel which is adapted to propelling the vehicle in a first direction. It is advantageous to first connect the first gearwheel to its shaft and then connect the third gearwheel for power-transmitting communication with the first gearwheel, since the connection of the first gearwheel is effected with a synchronising device.

According to an embodiment of the invention, the extra equipment takes the form of a retarder, resulting in a simpler and more energy-efficient way of connecting a supplementary brake to the gearbox.

According to an embodiment of the invention, the extra equipment takes the form of a power take-off, resulting in simpler connection of a power take-off to the gearbox while at the same time allowing larger variations in gear ratio during operation of the power take-off.

According to an embodiment of the invention, a planetary gear is provided in the gearbox after the first gearwheel on the first shaft and is put into a neutral state before it is ensured that the third gearwheel is out of engagement with the first gearwheel. Ensuring that the planetary gear is in a neutral state before the power take-off is connected thus makes it possible, in motor vehicle applications, to use the power take-off even when the vehicle's powered wheels are not rotating.

According to an embodiment of the invention, it is ensured that the power take-off is off-load before it is connected. The constituent parts of the gearbox are thus protected against torque peaks which might occur if too much resistance is connected immediately.

LIST OF DRAWINGS

DETAILED DESCRIPTION OF THE INVENTION

Figure 5:
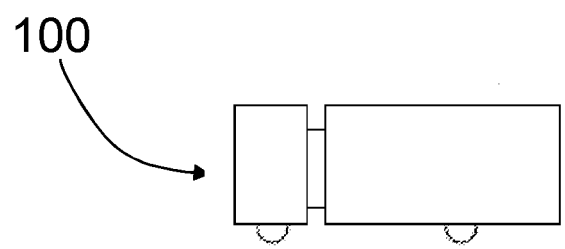
FIG. 5 depicts schematically a motor vehicle according to the invention.

The invention is described in more detail below with reference to the drawings. FIG. 5 depicts schematically a motor vehicle 100 according to the invention. The exemplified vehicle 100 is a heavy vehicle in the form of a truck. It may alternatively be a bus or a light truck. The vehicle 100 is provided with a gearbox according to the invention.

Figure 1:
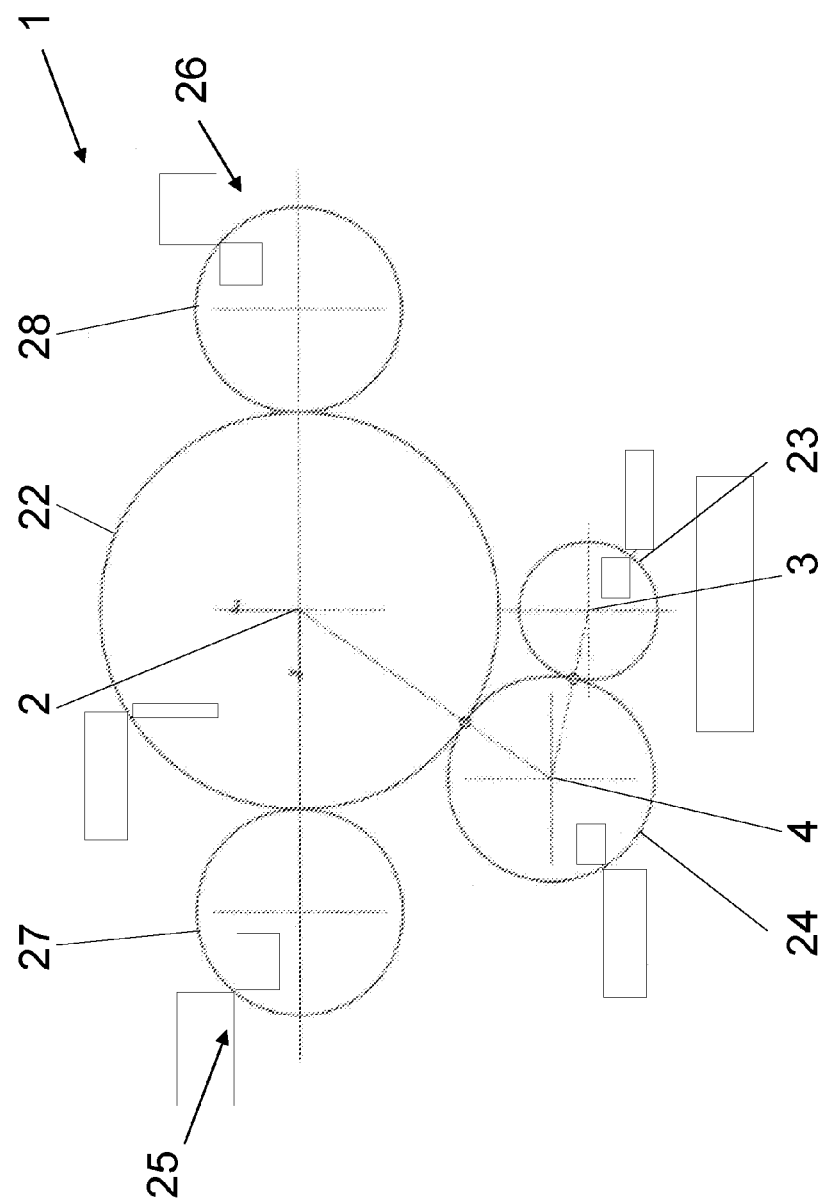
FIG. 1 depicts schematically a cross-section, from the rear, through the reverse gear of a gearbox according to the invention.
Figure 2:
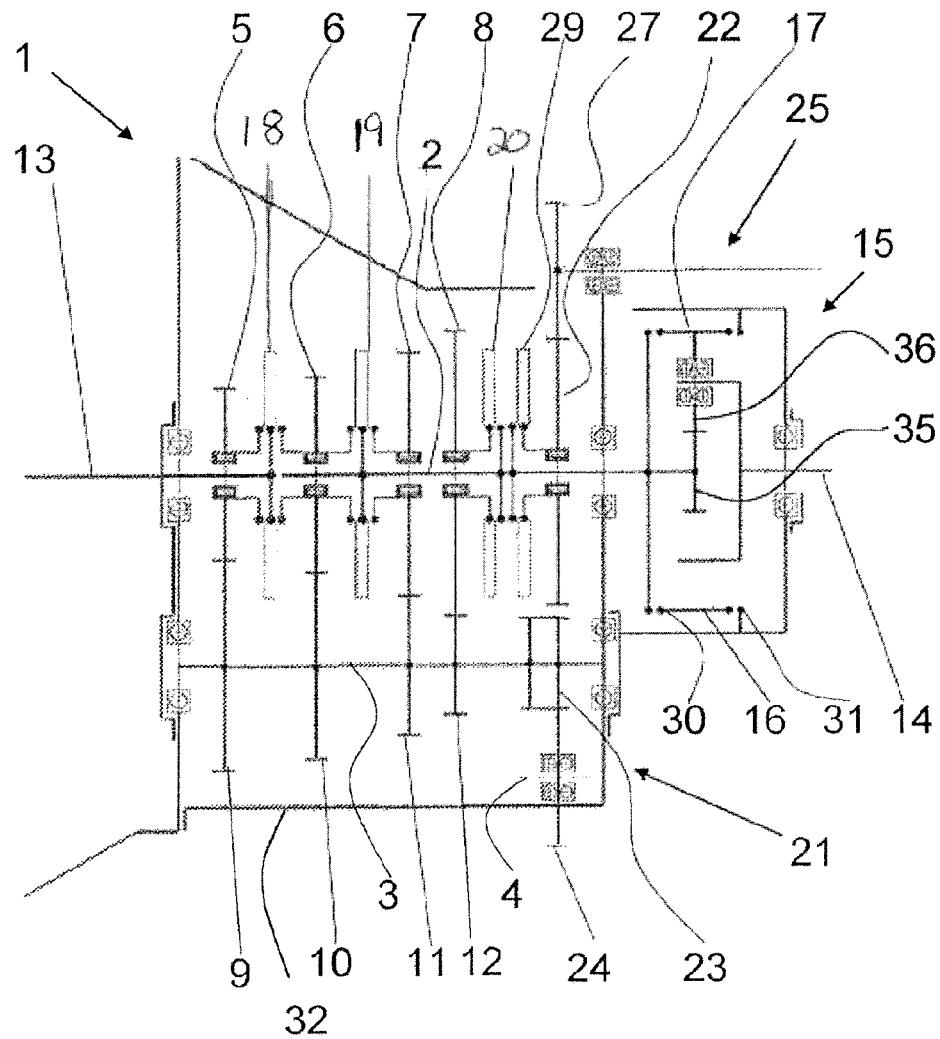
FIG. 2 is a partly cutaway sideview through a gearbox according to the invention.
Figure 4:
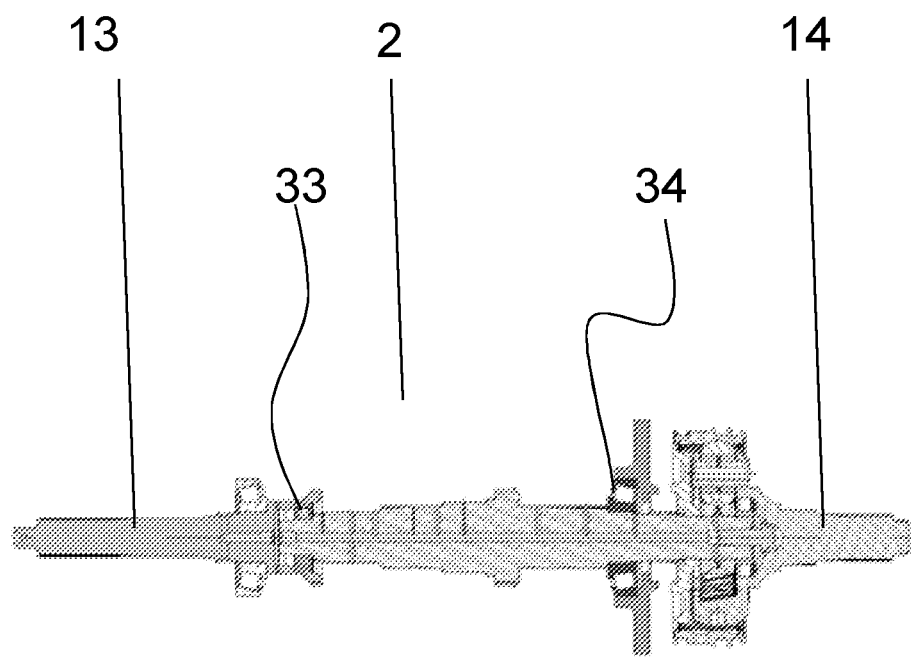
FIG. 4 depicts schematically a mainshaft and its bearings.

FIGS. 1 and 2 depict schematically a gearbox 1 according to the invention. In the drawings, the gearbox is installed in a motor vehicle, preferably a heavy utility vehicle. The gearbox is surrounded by a housing 32 which accommodates a mainshaft 2, a countershaft 3 and an intermediate shaft 4. The mainshaft is supported by a forward bearing 33 and a rear bearing 34 (see FIG. 4). The gearbox has also an input shaft 13 and an output shaft 14. A number of gearwheels 6, 7, 8 mounted on the mainshaft 2 are intended, in conjunction with a gearwheel 5 on the input shaft 13, to propel the vehicle in a second direction which in the drawing is forwards. Corresponding gearwheels 9, 10, 11, 12 are firmly mounted on the countershaft 3 for constant engagement with the gearwheels 5, 6, 7, 8. The two gearwheels 5, 6 furthest forward (nearest to an undepicted engine) in FIG. 2 constitute a conventional split gear. To connect a gear, i.e. to lock any of the gearwheels 5, 6, 7, 8 to, for joint rotation with, the respective shaft, there are conventional synchronising devices 18, 19, 20.

The gearbox in the drawings is equipped with a range gear unit here depicted as a planetary gear 15. The planetary gear is equipped conventionally with a sunwheel 35 firmly mounted on the mainshaft 2, a number of planet wheels 36 in engagement with the sunwheel and, on the outside of the planet wheels, a ring gear 16 in engagement with the planet wheels. Moving the ring gear 16 to the left in the drawing puts the planetary gear 15 into high range via a first synchronising device 30, and moving the ring gear to the right puts the planetary gear into low range via a second synchronising device 31. A device 17 can be used to put the planetary gear 15 into a neutral state in which the gearbox mainshaft 2 is disconnected from the output shaft 14 and no power transmission takes place between these two shafts.

Figure 3:
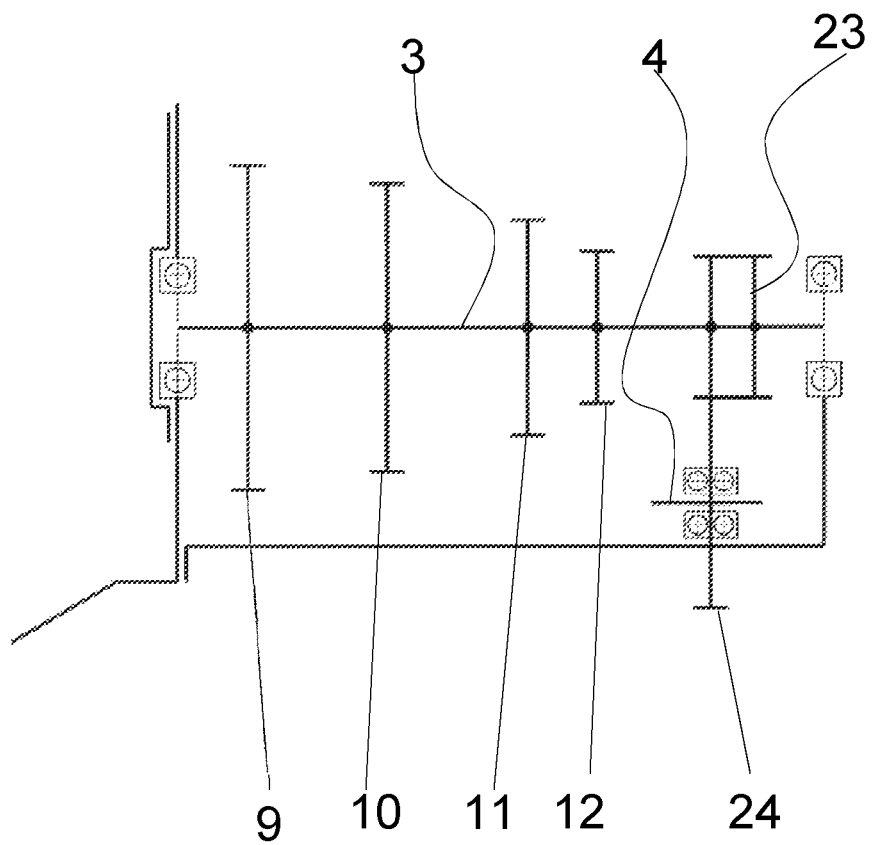
FIG. 3 depicts schematically a detail of the gearbox in FIG. 2.

The gearbox in FIG. 2 is also equipped with a reverse gear 21. Propelling the vehicle in a first direction, which in the drawing is its reversing direction, involves using a first reverse gear 22 situated on the mainshaft 2 and a second reverse gear 23 situated on the countershaft 3. As may be seen in FIG. 1, these gearwheels 22, 23 are not in mutual engagement. To change the direction of rotation of the mainshaft 2 relative to the input shaft 13 so as to propel the vehicle rearwards, the power is transferred from the second reverse gear 23 via a third gearwheel 24 which serves as an intermediate reverse gear 24 and is situated on the intermediate shaft 4. The intermediate reverse gear 24 can be moved along the intermediate shaft 4 into and out of engagement with the first reverse gear 22. FIG. 3 depicts a detail of FIG. 2 in which the intermediate reverse gear 24 is in a disconnected state. In FIG. 2 the intermediate reverse gear 24 is connected. To make it easier to reconnect the intermediate reverse gear 24 to the first reverse gear 22, the teeth on the intermediate reverse gear 24 and the first reverse gear 22 may be pointed by their tips being somewhat chamfered off in the axial direction. The vehicle has in a conventional way to come to a halt to allow connection to take place and the reversing facility to be engaged. Connecting the first reverse gear 22 involves using a synchronising device 29 in a conventional way.

Extra equipment, e.g. a retarder 25 or a power take-off 26, is connected via further power-transmitting means depicted in the drawings as gearwheels 27, 28.

The advantage of using the first reverse gear 22 to connect extra equipment 25, 26 is that no separate gearwheel is needed on the mainshaft 2 to cater for disconnectable extra equipment. For extra equipment to be usable when the vehicle is in motion, it has to be connected to a gearwheel which is not in engagement with a corresponding gearwheel on the countershaft 3. It is in fact not possible to have at the same time two or more gearwheels (gears) engaged by being locked to, for joint rotation with, the mainshaft 2, since each forward-propelling gearwheel 6, 7, 8 is in constant engagement with the respective gearwheel 10, 11, 12 on the countershaft 3. In contrast, the mainshaft reverse gear 22 is not in engagement with its respective countershaft gear 23, see FIG. 1, since it is the intermediate reverse gear 24 which transmits power between the first reverse gear 22 and the second reverse gear 23 and can be moved into and out of engagement with the first reverse gear 22. It is therefore possible for both the first reverse gear 22 and a forward-propelling gearwheel 6, 7, 8 to be at the same time locked to, for joint rotation with, the mainshaft 2 at times when the intermediate reverse gear 24 is out of engagement with the first reverse gear 22. The first reverse gear 22 may thus be useful even when the vehicle is not intended to reverse, unlike the state of the art which merely results in an energy loss except when the vehicle is reversing.

Reversing involves the intermediate reverse gear 24 being connected to engagement with the first reverse gear 22. The mainshaft reverse gear 22 is then locked to, for joint rotation with, the mainshaft by its synchronising device 29. Alternatively, the first reverse gear 22 may be locked to, for joint rotation with, the mainshaft before the intermediate reverse gear 24 is connected. The advantage of first locking the first reverse gear to the mainshaft is that the connection is synchronised via the device 29. The mainshaft reverse gear 22 will then drive the mainshaft in an opposite direction to that of the input shaft 13. During forward propulsion with no extra equipment 25, 26 connected, the intermediate reverse gear 24 is out of engagement with the first reverse gear 22, which via the synchronising device 29 is disconnected from, and therefore free to rotate relative to, the mainshaft, resulting in no energy losses.

Connecting extra equipment 25, 26 involves first ensuring that the intermediate reverse gear 24 is out of engagement with the mainshaft reverse gear 22, before the latter is locked by means of its synchronising device 29 and will therefore rotate with the mainshaft. As previously mentioned, the extra equipment may take the form of a retarder 25. Where the retarder is situated on a gearbox with a planetary gear as in the drawing, it can be used in both high and low ranges. When switching between high and low ranges, the retarder 25 has to be disconnected to avoid damaging the planetary gear's synchronising devices 30, 31. The temporary lack of braking action which then occurs may for example be compensated by the vehicle's wheel brakes. During low-range running, the retarder's action is improved in that it is then boosted by the planetary gear's gearing. A further advantage of the invention is that as the teeth on the first reverse gear 22 have a different angle from those on the gearwheels 6, 7, 8 which are intended for forward propulsion, the load distribution when using the retarder 25 becomes very advantageous for the bearings which support the mainshaft. Instead of loading the weaker forward bearings (nearest to the engine), which are often of spigot type, the load during operation of the retarder 25 shifts to the stronger rear bearings 34 on the mainshaft, i.e. the same load direction as when the vehicle is reversing. During engine braking, the forward bearings are already heavily loaded and it is therefore very advantageous to reduce/equalise the load on them and thereby lengthen their service life by operating the retarder according to the invention.

The extra equipment may also take the form of a power take-off 26. The power take-off may be connected both when the vehicle is travelling forwards and when it is stationary. To be able to run the power take-off when the vehicle is stationary, the planetary gear 15 has first to be put into a neutral state via the device 17. When the power take-off is connected to the gearbox, the latter's other gears 6, 7, 8 may be used to drive the power take-off at different gear ratios, since the mainshaft reverse gear 22 can be locked to, for joint rotation with, the mainshaft while at the same time one of the forward-propelling gearwheels 6, 7, 8 is also so locked. It is possible to connect the power take-off during operation of the vehicle, but only when the power take-off is in an off-load state, in order to protect other parts of the gearbox, especially the planetary gear's synchronising device, from torque peaks. "Connecting" the power take-off takes place when the first reverse gear 22 is put into power-transmitting communication with the mainshaft via the synchronising device 29. In addition, the power take-off may be on-load or off-load.

The vehicle may also be equipped with two or more forms of extra equipment, one of which may be a retarder.

The invention is described above in relation to a gearbox in a motor vehicle. It is particularly advantageous to employ the invention in the case of an automatically operated manual gearbox, often called AMT, since the control of the gearbox is then conducted entirely electronically. Heavy motor vehicles, e.g. trucks, tractor units and buses, are often provided with such a gearbox which is known per se, e.g. from SE0950874. An automatically operated manual gearbox is operable by the driver via an electronic control device by using an operating means in the form of a gear lever or the like. When so desired, the driver may manually order the transmission to change gear by using the operating means or by having the electronic control device automatically take care of choosing suitable gears for the transmission. In either case, the gearchange operations which take place in the gearbox are controlled by the electronic control device in a preprogrammed way depending on which gears the change is to take place between.

Computer programme code for implementing a method according to the invention is with advantage included in a computer programme which can be read into an internal memory of a computer, e.g. the internal memory of an electronic control unit of a motor vehicle. Such a computer programme is with advantage provided via a computer programme product comprising a data storage medium which can be read by an electronic control unit and which has the computer programme stored on it. Said data storage medium may for example be an optical medium in the form of a CD ROM, a DVD etc., a magnetic medium in the form of a hard disc, a diskette, a cassette tape etc., or a flash memory or a memory of the ROM, PROM, EPROM or EEPROM type.

It is also conceivable to employ the invention on other types of propulsion devices, e.g. on a means of transport or on a free-standing engine. The invention may be employed on any type of gearbox where a need to connect extra equipment arises.

The present invention is not restricted to the preferred embodiments described above. Sundry alternatives, modifications and equivalents may be used. The above embodiments are therefore not to be regarded as limiting the invention's protective scope, which is defined by the attached claims.

The invention claimed is:

1. A gearbox for an engine, the gearbox comprising:
   a first shaft;
   an input shaft connected to a first end of the first shaft; and
      an output shaft connected to a second end of the first shaft;
   at least two first gearwheels supported for rotation on and spaced apart on the first shaft, the at least two first gearwheels comprising a first gearwheel on the first shaft connected for driving the first shaft for rotation in a first direction and a second gearwheel or gearwheels on the first shaft connected for driving the first shaft for rotation in a second direction;
   selectively operable devices for locking the second gearwheel or gearwheels situated on the first shaft to the first shaft for joint rotation with the first shaft;
   a second shaft;
   at least two second gearwheels firmly mounted on the second shaft to rotate with the second shaft, one of the second gearwheels on the second shaft being so located on the second shaft and so configured and operable as to cooperate with the first gearwheel on the first shaft;
   a third shaft;
   a third gearwheel on the third shaft; and the third gearwheel is in power-transmitting communication with the first gearwheel on the first shaft and with the second gearwheel on the second shaft during rotation of the third gearwheel in the first direction;
   the third gearwheel can be selectively disengaged from the first gearwheel on the first shaft; and
   the first gearwheel on the first shaft is in power-transmitting communication with one or more further power-transmitting apparatus configured and operable at selected times for connecting the first gearwheel to at least one extra equipment item.

2. A gearbox according to claim 1, wherein the at least one extra equipment item is a vehicle retarder.

3. A gearbox according to claim 1, wherein the at least one extra equipment item is a power take-off.

4. A gearbox according to claim 1, further comprising a planetary gear mounted on the first shaft after the first gearwheel relative to the input shaft.

5. A gearbox according to claim 4, wherein the planetary gear is configured so as to be put into a state in which no tractive power is transmitted between the first shaft and the output shaft.

6. A gearbox according to claim 1, wherein the first gearwheel on the first shaft and the second gearwheel or gearwheels on the first shaft each have respective gear teeth, an angle of the gear teeth of the first gearwheel on the first shaft differs from another angle of the gear teeth of the second gearwheel or gearwheels on the first shaft.

7. A gearbox according to claim 1, wherein the third gearwheel is movable axially on the third shaft.

8. A gearbox according to claim 1, wherein at least one of the further power transmitting apparatus includes a gearwheel.

9. A method for connecting an extra equipment item to a gearbox of claim 1, the method comprising:
   disengaging the third gearwheel from the first gearwheel;
   connecting the extra equipment item via a power-transmitting apparatus to the first gearwheel; and
   locking the first gearwheel to the first shaft, for joint rotation with the first shaft, thereby operating the extra equipment item.

10. A method according to claim 9, wherein the at least one extra equipment item is a vehicle retarder; and
   the method further comprising applying the method in a motor vehicle, by providing a retarder for the vehicle as the extra equipment item.

11. A method according to claim 9, further comprising providing a power take off as the extra equipment item.

12. A method according to claim 9, further comprising:
   on the first shaft providing a planetary gear that is situated after, relative to the input shaft, the first gearwheel;
   disengaging the third gearwheel from the first gearwheel; and
   then putting the planetary gear into a state in which no tractive power is transmitted between the first shaft and the output shaft.

13. A method according to claim 11, discontinuing or disconnecting a load upon the power take-off before connecting the power take off to the first gearwheel.

14. A method according to claim 9, further comprising moving the third gearwheel axially on the third shaft for engaging and disengaging the third gearwheel with the first gearwheel.

15. A method according to claim 9, wherein the gearbox is situated in a motor vehicle such that when the first shaft is driven in a first direction, a vehicle motion direction reverses.

16. A non-transitory computer-readable data storage medium comprising a computer programme product which can be read by an electronic control unit, and a computer programme code stored in a non-transitory form on the medium, wherein the computer programme code is configured for applying in a motor vehicle the method according to claim 9.

17. An electronic control unit of a motor vehicle comprising a gear lever, a memory which is connected to the gear lever, and the data storage medium of claim 16 connected to the gear lever.

18. A motor vehicle provided with a gearbox according to claim 1, wherein the first direction is the vehicle's reversing direction.

* * * * *